(12) United States Patent
Gu et al.

(10) Patent No.: US 10,913,480 B2
(45) Date of Patent: Feb. 9, 2021

(54) CHILD SITTING SADDLE AND CHILD STROLLER

(71) Applicant: GOODBABY CHILD PRODUCTS CO., LTD., Jiangsu (CN)

(72) Inventors: Xiaocong Gu, Jiangsu (CN); Shilei Zhu, Jiangsu (CN)

(73) Assignee: GOODBABY CHILD PRODUCTS CO., LTD., Jiangsu (CN)

(*) Notice: Subject to any disclaimer, the term of this patent is extended or adjusted under 35 U.S.C. 154(b) by 105 days.

(21) Appl. No.: 16/465,782

(22) PCT Filed: Nov. 3, 2017

(86) PCT No.: PCT/CN2017/109239
§ 371 (c)(1),
(2) Date: May 31, 2019

(87) PCT Pub. No.: WO2018/099240
PCT Pub. Date: Jun. 7, 2018

(65) Prior Publication Data
US 2020/0023880 A1    Jan. 23, 2020

(30) Foreign Application Priority Data

Dec. 2, 2016   (CN) .................... 2016 2 1318773 U

(51) Int. Cl.
*B62B 5/00*       (2006.01)
*B62B 9/12*       (2006.01)
(Continued)

(52) U.S. Cl.
CPC ............... *B62B 9/12* (2013.01); *B62B 9/104* (2013.01); *A47C 17/162* (2013.01); *B62B 7/123* (2013.01);
(Continued)

(58) Field of Classification Search
CPC .... B60N 2/2821; B60N 2/2851; B60N 2/286; B60N 2/2806; B60N 2/2863; B62B 7/08
See application file for complete search history.

(56) References Cited

U.S. PATENT DOCUMENTS 2,606,593 A * 8/1952 Beurskens ........... A47D 13/043
                                                        280/7.1
2,805,076 A * 9/1957 Thomas ................... B62B 7/12
                                                        280/643
(Continued)

FOREIGN PATENT DOCUMENTS

CN         204196989 U      3/2015
CN         204236539 U      4/2015
(Continued)

OTHER PUBLICATIONS

International Search Report for PCT Application No. PCT/CN2017/109239, dated Jan. 24, 2018 in 4 pages.
(Continued)

*Primary Examiner* — Kiran B Patel
(74) *Attorney, Agent, or Firm* — Knobbe, Martens, Olson & Bear, LLP

(57) ABSTRACT

Disclosed are a child sitting saddle and a child stroller, the child sitting saddle comprises an enclosure frame assembly, a plug connector, a seat rod assembly and a cloth cover including a seat cloth cover and a backrest cloth cover; the child sitting saddle further comprises a first lock mechanism for locking the enclosure frame assembly with the plug connector, a connecting rod and a second lock mechanism disposed between the seat rod assembly and the connecting rod; when in a chair state, the seat rod assembly obliquely intersects with the backrest cloth cover; when in a sleeping basket state, the seat rod assembly, the seat cloth cover and the backrest cloth cover are all disposed horizontally. The
(Continued)

child sitting saddle can be converted between the chair state and the sleeping basket state, and the conversion is convenient.

18 Claims, 4 Drawing Sheets

(51) Int. Cl.
  B62B 9/10 (2006.01)
  *A47C 17/16* (2006.01)
  *B62B 7/12* (2006.01)
(52) U.S. Cl.
  CPC ....... *B62B 2205/20* (2013.01); *B62B 2206/00* (2013.01)

(56) References Cited

U.S. PATENT DOCUMENTS

| | | | | |
|---|---|---|---|---|
| 3,248,125 | A * | 4/1966 | Gill | B62B 7/123 280/47.4 |
| 3,421,774 | A * | 1/1969 | Patterson | B62B 7/08 280/642 |
| 4,741,551 | A * | 5/1988 | Perego | B62B 7/08 280/47.4 |
| 5,028,061 | A * | 7/1991 | Hawkes | B62B 7/04 280/47.4 |
| 5,201,535 | A * | 4/1993 | Kato | B62B 7/123 280/30 |
| 5,522,614 | A * | 6/1996 | Eyman | B62B 7/08 280/642 |
| 5,676,386 | A * | 10/1997 | Huang | B62B 7/123 280/30 |
| 5,718,439 | A * | 2/1998 | Wang | B62B 7/142 280/47.38 |
| 5,988,670 | A * | 11/1999 | Song | B62B 7/123 280/47.4 |
| 6,286,844 | B1 * | 9/2001 | Cone, II | B62B 9/28 280/47.41 |
| 7,017,922 | B2 * | 3/2006 | Hartenstine | B62B 7/10 224/409 |
| 7,188,858 | B2 * | 3/2007 | Hartenstine | B62B 7/083 280/642 |
| 8,029,014 | B2 * | 10/2011 | Ahnert | B62B 9/104 280/650 |
| 8,360,498 | B1 * | 1/2013 | Ostad | B62B 9/145 296/77.1 |
| 9,308,929 | B1 * | 4/2016 | Dowd | B62B 7/062 |
| 10,065,669 | B2 * | 9/2018 | Mattarocci | B62B 9/28 |
| 10,479,391 | B2 * | 11/2019 | Haut | B62B 7/142 |
| 10,513,285 | B1 * | 12/2019 | Menen | B62B 7/142 |
| 2002/0036391 | A1 * | 3/2002 | Sweeney | B62B 9/28 280/650 |
| 2005/0258620 | A1 * | 11/2005 | Pike | B62B 9/20 280/647 |
| 2008/0150247 | A1 * | 6/2008 | Lake | B62B 7/123 280/47.41 |
| 2010/0244393 | A1 * | 9/2010 | Thomas | B62B 9/20 280/33.993 |
| 2011/0284604 | A1 * | 11/2011 | Conrad | B62B 7/145 224/409 |
| 2012/0086188 | A1 * | 4/2012 | Conrad | B62B 7/142 280/647 |
| 2012/0126512 | A1 * | 5/2012 | Kane | B62B 7/062 280/647 |
| 2012/0193893 | A1 * | 8/2012 | Conrad | B62B 7/008 280/647 |
| 2012/0193950 | A1 * | 8/2012 | Winterhalter | B62B 9/14 297/184.13 |
| 2012/0286497 | A1 * | 11/2012 | Tsai | B62B 7/064 280/647 |
| 2013/0213749 | A1 * | 8/2013 | Li | B62B 9/08 188/156 |
| 2013/0292923 | A1 * | 11/2013 | Burchi | B62B 7/06 280/647 |
| 2013/0292987 | A1 * | 11/2013 | Doucette | B62B 9/104 297/423.3 |
| 2014/0319884 | A1 * | 10/2014 | Doucette | B62B 7/00 297/118 |
| 2014/0345980 | A1 * | 11/2014 | Shellenberger | B62B 9/087 188/20 |
| 2016/0039447 | A1 * | 2/2016 | Haut | B62B 9/104 280/650 |
| 2016/0101802 | A1 * | 4/2016 | Zhong | A47D 9/00 280/47.4 |
| 2016/0339940 | A1 * | 11/2016 | Lee | B62K 5/02 |
| 2017/0217470 | A1 * | 8/2017 | Popp | B62B 7/064 |
| 2018/0194384 | A1 * | 7/2018 | Li | B62B 9/24 |
| 2019/0322304 | A1 * | 10/2019 | Zhong | B62B 7/062 |
| 2020/0010105 | A1 * | 1/2020 | Cheng | B62B 9/28 |
| 2020/0189426 | A1 * | 6/2020 | Napiorkowski | B62B 5/067 |

FOREIGN PATENT DOCUMENTS

| | | |
|---|---|---|
| CN | 204488890 U | 7/2015 |
| CN | 204623543 U | 9/2015 |
| CN | 206374786 U | 8/2017 |
| DE | 202005019055 U1 | 3/2006 |
| WO | WO 2018/099240 A1 | 6/2018 |

OTHER PUBLICATIONS

Written Opinion for PCT Application No. PCT/CN2017/109239, dated Jan. 24, 2018 in 5 pages.

* cited by examiner

CHILD SITTING SADDLE AND CHILD STROLLER

CROSS-REFERENCE TO RELATED APPLICATIONS

This application is the U.S. National Phase under 35. U.S.C. § 371 of International Application PCT/CN2017/109239, filed Nov. 3, 2017, which claims priority to Chinese Patent Application No. 201621318773.5, filed Dec. 2, 2016.

TECHNICAL FIELD OF THE INVENTION

The present disclosure relates to the field of children products, in particular to a child sitting saddle and a child stroller.

BACKGROUND OF THE INVENTION

The child stroller provides great convenience for people to do outdoor activities, and the child stroller generally includes a stroller frame and a child sitting saddle provided on the stroller frame, some child sitting saddles have the function of a chair, some child sitting saddles have the function of a sleeping basket, and in order to facilitate the replacement of the child sitting saddles of different structures, the child sitting saddles are generally detachably arranged on the stroller frame, but if the child seat sitting saddle is required to satisfy the functions of both the chair and the sleeping basket, it still requires child sitting saddles of both structures, which results in a high cost and impossible replacement in real time as needed, and the replacement can be only achieved when both kinds of child sitting saddles are available, and therefore, even if the two kinds of accessories are equipped, they can't be replaced at any time, and thus they can't meet the needs of children well.

SUMMARY OF THE INVENTION

The present disclosure is aimed at the deficiency of the prior art, and provides a child sitting saddle capable of converting between a chair state and a sleeping basket state and convenient for conversion.

To achieve the above purpose, the technical solution employed by the present disclosure is:

A child sitting saddle, comprises an enclosure frame assembly, a plug connector for plug connecting the child sitting saddle to a stroller frame of a child stroller, a seat rod assembly located below the enclosure frame assembly, and a cloth cover sleeved on the enclosure frame assembly and the seat rod assembly, the plug connector and the enclosure frame assembly are rotatably connected, the cloth cover comprises a seat cloth cover and a backrest cloth cover, the seat rod assembly is disposed on the seat cloth cover, and the child sitting saddle further comprises a first lock mechanism for locking the enclosure frame assembly with the plug connector and a first unlock mechanism for unlocking the first lock mechanism, and the child sitting saddle further comprises a connecting rod provided between the seat rod assembly and the enclosure frame assembly, and a first end portion of the connecting rod being fixedly connected to the enclosure frame assembly, and a second end portion of the connecting rod being rotatably connected to the seat rod assembly; the child sitting saddle further comprises a second lock mechanism disposed between the seat rod assembly and the connecting rod, and a second unlock mechanism for unlocking the second lock mechanism; the child sitting saddle has a chair state and a sleeping basket state, and when the child sitting saddle is in the chair state, both of the first lock mechanism and the second lock mechanism are in a locked state, the seat rod assembly and the connecting rod are fixed with respect to each other, and the seat rod assembly obliquely intersects with the backrest cloth cover; when the child sitting saddle is in the sleeping basket state, the first lock mechanism is in the locked state while the second lock mechanism is in an unlocked state, the cloth cover is tightly sleeved on the enclosure frame assembly and the seat rod assembly, and the seat rod assembly, the seat cloth cover and the backrest cloth cover are all in a horizontal state.

Preferably, the second lock mechanism comprises a lock rod slidably arranged on the seat rod assembly, and a lock slot disposed on the connecting rod and fitted with the lock rod, the connecting rod is provided with only one of the lock slots, and when the second lock mechanism is in the locked state, the lock rod is stuck in the lock slot, and when the second lock mechanism is in the unlocked state, the lock rod is disengaged from the lock slot.

Further, the second lock mechanism further comprises a resetting member for driving the lock rod to reset from the unlocked state to the locked state, the resetting member being disposed between the lock rod and the connecting rod.

More further, the resetting member is a tension spring, and two end portions of the tension spring are fixed to the lock rod and the connecting rod, respectively.

Further, the seat rod assembly comprises a seat rod extending along a front-rear direction, the second end portion of the connecting rod is rotatably connected to a rear end portion of the seat rod, the seat rod is provided with a sliding slot extending along the front-rear direction, the sliding slot is fitted with the lock rod, and the lock rod is disposed in the sliding slot and the lock rod is capable of slidably moving through the sliding slot in an extending direction of the sliding slot.

Further, the second lock mechanism further comprises a pull rod slidable with respect to the seat rod assembly along a front-rear direction, and a pull handle fixedly disposed on the pull rod, the pull rod is fixedly connected with the lock rod, and when the pull handle is pulled frontward, the lock rod is slided frontward with respect to the seat rod assembly by pulling the pull rod until the lock rod is disengaged from the lock slot.

Further, the connecting rod is provided with a support portion, and when the child sitting saddle is in the sleeping basket state, the lock rod is provided on the support portion.

Preferably, the enclosure frame assembly has a close frame structure, the connecting rods are respectively disposed at two sides of the enclosure frame assembly, the seat rod assembly comprises a seat rod extending along a front-rear direction, the seat rods have a U-shaped structure with an opening facing rearward, a rear end portion of the U shape of the seat rod is rotatably connected with the second end portion of the connecting rod on a corresponding side, and the second lock mechanism is respectively disposed between the seat rods and the connecting rods on both sides.

Preferably, the enclosure frame assembly comprises a connector at a middle portion of the enclosure frame assembly, an upper enclosure frame connected to an upper end portion of the connector, and a lower enclosure frame connected to a lower end portion of the connector, the plug connector is rotatably connected with the connector, and one end portion of the connecting rod is fixedly connected to the connector.

The present disclosure further provides a child stroller, and the child stroller comprises a stroller frame and a child sitting saddle according to any one mentioned above detachably connected on the stroller frame.

Due to the use of the above technical solutions, the present disclosure has the following advantages over the prior art: the child sitting saddle of the present disclosure has a simple structure, and can be converted between the chair state and the sleeping basket state, and the conversion is convenient, and not only the conversion and adjustment at any time is realized, but also both the functions of the chair and the sleeping basket by equipping a stroller frame with only one child sitting saddle can be realized, which greatly reduces the production cost while being convenient for use.

Figure 1:
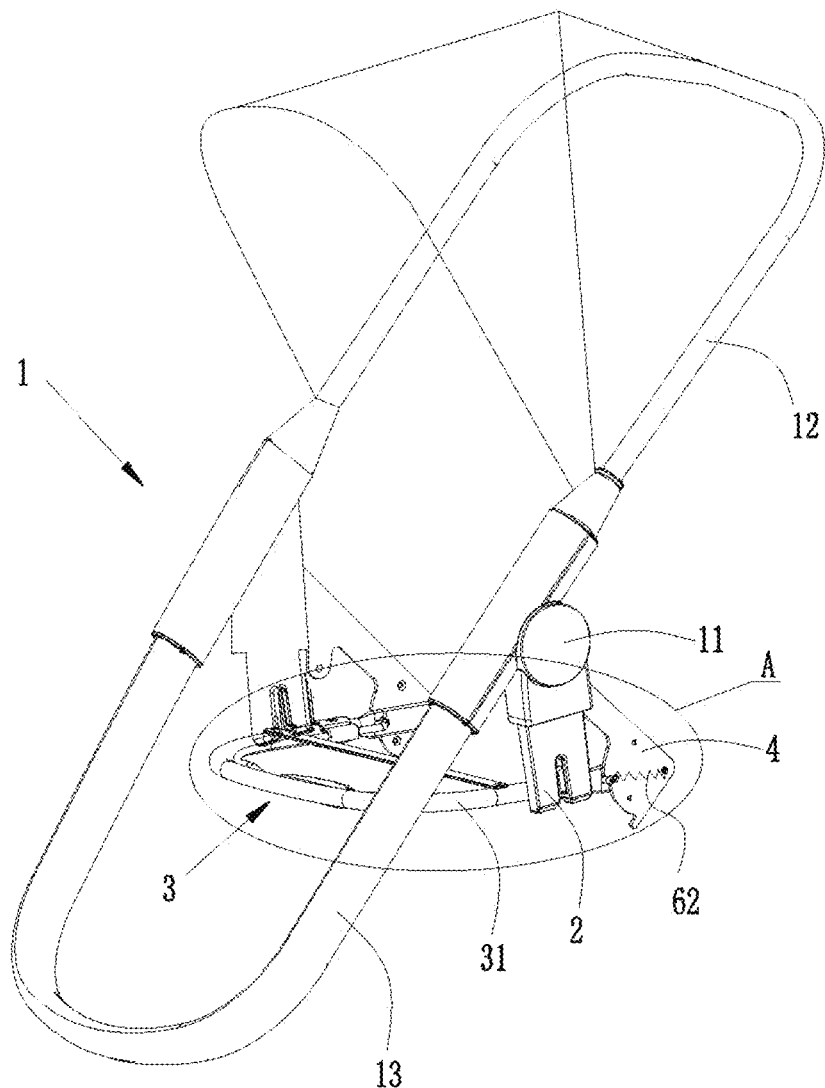
FIG. 1 is a schematic structure diagram of the child sitting saddle of the present disclosure (the child sitting saddle being in a chair state, without cloth cover)
Figure 2:
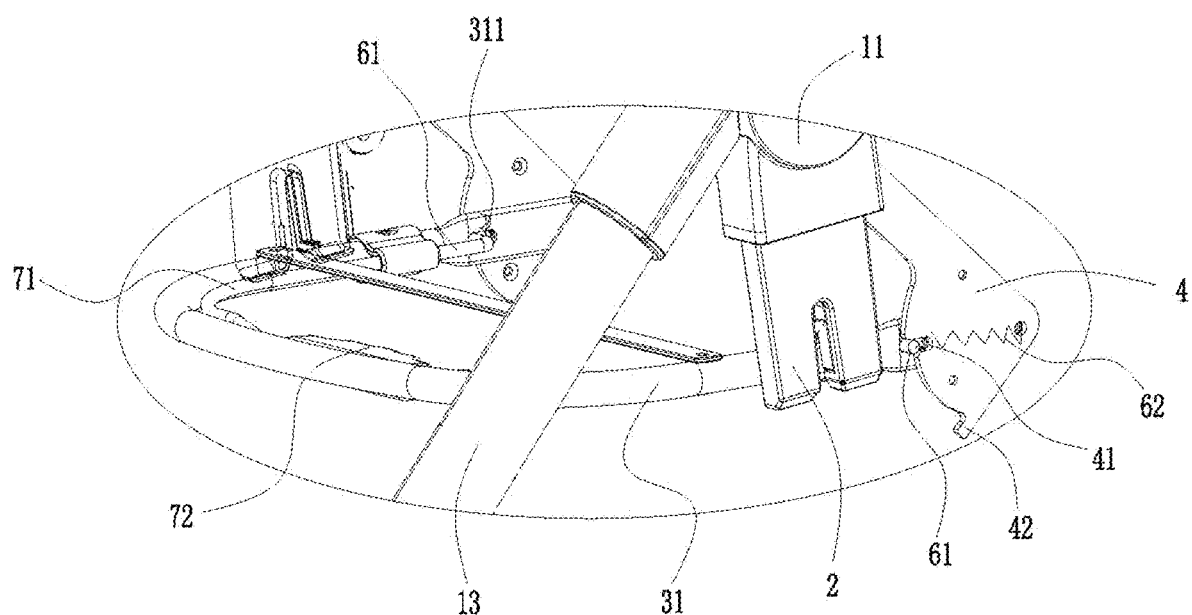
FIG. 2 is a partial enlarged view of Portion A in FIG. 1.

wherein, 1—enclosure frame assembly; 11—connector; 12—upper enclosure frame; 13—lower enclosure frame; 2—plug connector; 3—seat rod assembly; 31—seat rod; 311—sliding slot; 4—connecting rod; 41—lock slot; 42—support portion; 5—cloth cover; 61—lock rod; 62—resetting member resetting member; 71—pull rod; 72—pull handle.

DETAILED DESCRIPTION OF EXEMPLARY EMBODIMENTS

In the following, the technical solution of the present disclosure is further explained in detail combining with the accompanying drawings and specific embodiments.

A child sitting saddle of the present disclosure is detachably connected on a stroller frame of a child stroller, as shown in FIGS. 1-5, the child sitting saddle comprises an enclosure frame assembly 1, a plug connector 2 for plug connecting the child sitting saddle to the stroller frame, a seat rod assembly 3, a connecting rod 4 provided between the enclosure frame assembly 1 and the seat rod assembly 3, and a cloth cover 5 sleeved on the enclosure frame assembly 1 and the seat rod assembly 3.

The plug connector 2 is rotatably connected with the enclosure frame assembly 1, the seat rod assembly 3 is disposed below the enclosure frame assembly 1, a first end portion of the connecting rod 4 is fixedly connected to the enclosure frame assembly 1, and a second end portion of the connecting rod 4 is rotatably connected to the seat rod assembly 3, and the child sitting saddle further comprises a first lock mechanism disposed between the plug connector 2 and the enclosure frame assembly 1 for locking the relative positions thereof, a second lock mechanism disposed between the seat rod assembly 3 and the connecting rod 4 for locking the relative positions thereof, a first unlock mechanism for unlocking the first lock mechanism, and a second unlock mechanism for unlocking the second lock mechanism.

Specifically, the enclosure frame assembly 1 comprises a connector 11 at a middle portion of the enclosure frame assembly 1, an upper enclosure frame 12 connected to an upper end portion of the connector 11, and a lower enclosure frame 13 connected to a lower end portion of the connector 11, and the upper enclosure frame 12, the connector 11 and the lower enclosure frame 13 are connected successively to form a close frame structure, both of the upper enclosure frame 12 and the lower enclosure frame 13 have a U-shaped structure, the connectors 11 are respectively disposed at two sides of the child sitting saddle, two end portions of the connector 11 on each side are respectively connected with end portions of the opening of the U-shape of the upper enclosure frame 12 and the lower enclosure frame 13, both of the plug connector 2 and the connecting rod 4 are disposed on both of the left and right sides of the enclosure frame assembly 1, the plug connector 2 on each side is rotatably connected with the connector 11 on the corresponding side, and one end portion of the connecting rod 4 on each side is fixedly connected with the connector 11 on the corresponding sides.

The seat rod assembly 3 comprises a seat rod 31 extending along a front-rear direction, the seat rod 31 has a U-shaped structure with an opening facing rearward, the second end portion of the connecting rod 4 on each side is rotatably connected with an end portion of the U shape of the seat rod 31, respectively.

The first lock mechanism and the first unlock mechanism are respectively disposed between the plug connectors 2 on both sides and the enclosure frame assembly 1, and the specific structure of the first lock mechanism and the first unlock mechanism are not a technical point to be protected by the present disclosure, and any structure in the prior art can be employed.

The second lock mechanism comprises a lock rod 61 slidably arranged on the seat rod 31 along an extension direction of the seat rod 31, and a lock slot 41 is disposed on the connecting rod 4 and fitted with the lock rod 61, the connecting rod 4 on each side is provided with only one lock slot 41, and when the second lock mechanism is in the locked state, the lock rod 61 is stuck in the lock slot 41, and when the second lock mechanism is in the unlocked state, the lock rod 61 is disengaged from the lock slot 41.

The way in which the lock rod 61 is slidably disposed on the seat rod 31 is as follows: the seat rod 31 is provided with a sliding slot 311 extending along the front-rear direction, the sliding slot 311 is fitted with the lock rod 61, and the lock rod 61 is provided through the sliding slot 311, and is capable of sliding in an extending direction of the sliding slot 311.

The second lock mechanism further comprises a resetting member 62 for driving the lock rod 61 to reset from the unlocked state to the locked state, the resetting member 62 being disposed between the lock rod 61 and the connecting rod 4. In the present embodiment, the resetting member 62 is a tension spring, and two end portions of the tension spring are fixed to the lock rod 61 and the connecting rod 4, respectively.

The second lock mechanism further comprises a pull rod 71 slidably disposed on the seat rod 31 along an extension direction of the seat rod 31, and a pull handle 72 fixedly disposed on the pull rod 71, the pull rod 71 is fixedly connected with the lock rod 61, and when the pull handle 72 is pulled frontward, the lock rod 71 is slided frontward to drive the lock rod 61 to slide frontward within the sliding slot 311, until the lock rod 61 is disengaged from the lock slot 41, and the second lock mechanism is unlocked.

The second lock mechanisms are also provided on both of the left and right sides of the child sitting saddle, respectively, that is, the lock rods 61 are provided on both of the left and right sides of the child sitting saddle, respectively, the pull rod 71 has a U-shaped structure opened rearward, and two end portions of the U-shaped opening thereof are fixedly connected with the lock rod 61 on the corresponding side, respectively.

The cloth cover 5 comprises a seat cloth cover 51 and a backrest cloth cover 52, the seat cloth cover 51 is disposed between the lower enclosure frame 13 and the seat rod assembly 3, the backrest cloth cover 52 is disposed between the upper enclosure frame 12 and the seat rod assembly 3, and the seat rod assembly 3 is disposed on the seat cloth cover 51.

When the child sitting saddle is disposed on the stroller frame for use, the child sitting saddle has a chair state and a sleeping basket state.

Figure 3:
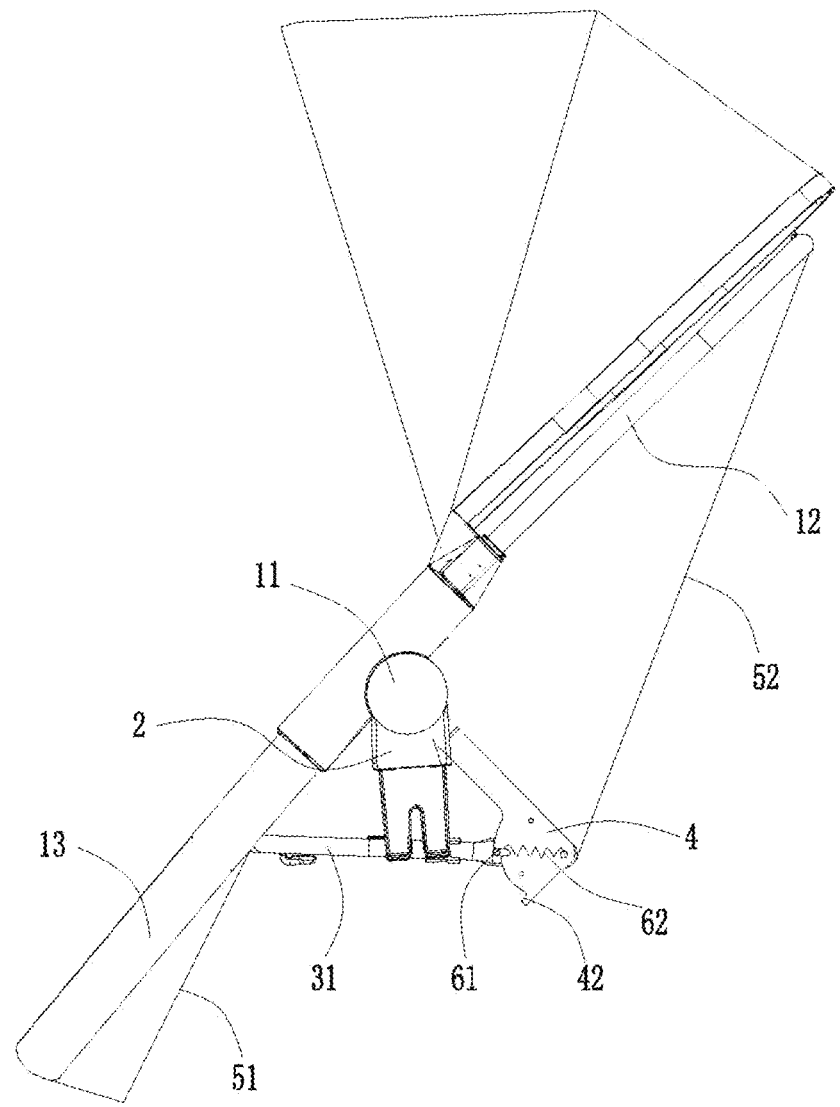
FIG. 3 is a side view of the child sitting saddle of the present disclosure (the child sitting saddle being in a chair state)

When the child sitting saddle is in the chair state, both of the first lock mechanism and the second lock mechanism are in a locked state, that is, the enclosure frame assembly 1, the plug connector 2, the seat rod assembly 3 and the connecting rod 4 are fixed with respect to one another, at this moment, the enclosure frame assembly 1 is in an inclined state of low front and high rear, that is, the lower enclosure frame 13 is below the upper enclosure frame 12, and the seat rod 31 is in a horizontal state, and the seat rod 31 obliquely intersects with the backrest cloth cover 52, as shown in FIGS. 1 and 3.

Figure 4:
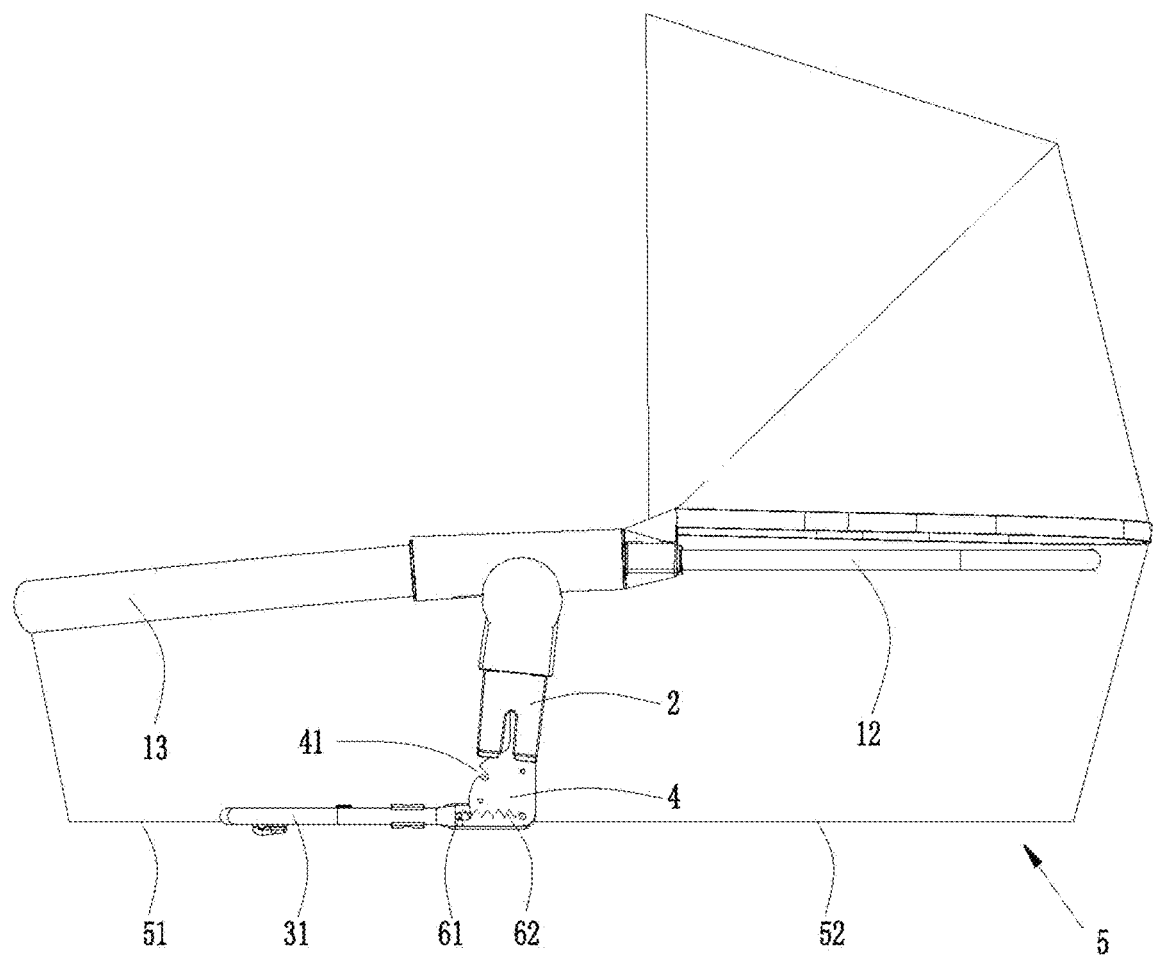
FIG. 4 is a side view of the child sitting saddle of the present disclosure (the child sitting saddle being in a sleeping basket state)
Figure 5:
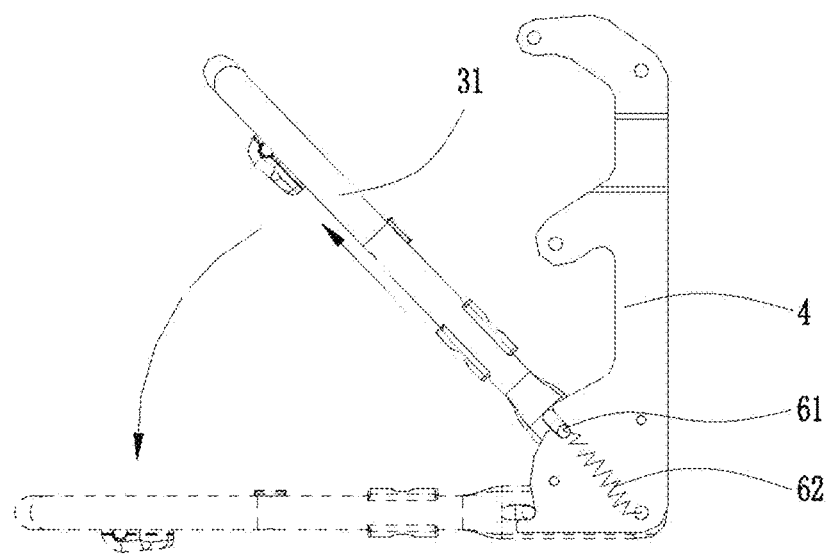
FIG. 5 is a schematic diagram of the relative position of the seat rod assembly and the connecting rod of the child sitting saddle of the present disclosure when converting between the chair state and the sleeping basket state.

When both of the first lock mechanism and the second lock mechanism are unlocked, the enclosure frame assembly 1 is rotatable with respect to the plug connector 2, and drives the connecting rod 4 to rotate with respect to the seat rod assembly 3, until the enclosure frame assembly 1 is rotated to a condition that the upper enclosure frame 12 and the lower enclosure frame 13 are approximately in a same horizontal plane, at this moment, the cloth cover 5 sleeved on the enclosure frame assembly 1 and the seat rod assembly 3 is in a tensioned state, and the seat rod 31, the seat cloth cover 51 and the backrest cloth cover 52 are all in a horizontal state, at this moment, after the first unlock mechanism is released, the first lock mechanism is in the locked state again, and a support portion 42 is disposed on the connecting rod 4, and after the second unlock mechanism is released, the lock rod 61 is disposed on the support portion 42, and the child sitting saddle is in the sleeping basket state, as shown in FIG. 4.

When the child sitting saddle is adjusted from the sleeping basket state to the chair state, it is only needed to operate the first unlock mechanism to unlock the first lock mechanism, and rotate the upper enclosure frame assembly 12 in an opposite direction to drive the connecting rod 41 to rotate synchronously, and during the process, the lock rod 61 is slided toward the lock slot 41 under the action of the resetting member 62, until the lock rod 61 is stuck in the lock slot 41, and the second lock mechanism is in the locked state, and at this moment, the first unlock mechanism is released, and the first lock mechanism is also in the locked state, and the child sitting saddle is in the chair state.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. A child sitting saddle, comprising an enclosure frame assembly, a plug connector for plug-in connecting the child sitting saddle to a stroller frame of a child stroller, a seat rod assembly located below the enclosure frame assembly, and a cloth cover sleeved on the enclosure frame assembly and the seat rod assembly, the plug connector and the enclosure frame assembly being rotatably connected, the cloth cover comprising a seat cloth cover and a backrest cloth cover, the seat rod assembly being disposed on the seat cloth cover, and the child sitting saddle further comprising a first lock mechanism for locking the enclosure frame assembly with the plug connector and a first unlock mechanism for unlocking the first lock mechanism, wherein the child sitting saddle further comprises a connecting rod provided between the seat rod assembly and the enclosure frame assembly, and a first end portion of the connecting rod being fixedly connected to the enclosure frame assembly, and a second end portion of the connecting rod being rotatably connected to the seat rod assembly; the child sitting saddle further comprises a second lock mechanism disposed between the seat rod assembly and the connecting rod, and a second unlock mechanism for unlocking the second lock mechanism; the child sitting saddle has a chair state and a sleeping basket state, and when the child sitting saddle is in the chair state, both of the first lock mechanism and the second lock mechanism are in a locked state, the seat rod assembly and the connecting rod are fixed with respect to each other, and the seat rod assembly obliquely intersects with the backrest cloth cover; when the child sitting saddle is in the sleeping basket state, the first lock mechanism is in the locked state and the second lock mechanism is in an unlocked state, the cloth cover is tightly sleeved on the enclosure frame assembly and the seat rod assembly, and the seat rod, the seat cloth cover and the backrest cloth cover are all in a horizontal state.

2. The child sitting saddle according to claim 1, wherein, the second lock mechanism comprises a lock rod slidably arranged on the seat rod assembly, and a lock slot disposed on the connecting rod and fitted with the lock rod, the connecting rod is provided with only one of the lock slots, and when the second lock mechanism is in the locked state, the lock rod is stuck in the lock slot, and when the second lock mechanism is in the unlocked state, the lock rod is disengaged from the lock slot.

3. The child sitting saddle according to claim 2, wherein, the second lock mechanism further comprises a resetting member for driving the lock rod to reset from the unlocked state to the locked state, the resetting member being disposed between the lock rod and the connecting rod.

4. The child sitting saddle according to claim 3, wherein, the resetting member is a tension spring, and two end portions of the tension spring are fixed to the lock rod and the connecting rod, respectively.

5. The child sitting saddle according to claim 2, wherein, the seat rod assembly comprises a seat rod extending along a front-rear direction, the second end portion of the connecting rod is rotatably connected to a rear end portion of the seat rod, the seat rod is provided with a sliding slot extending along the front-rear direction, the sliding slot is fitted with the lock rod, and the lock rod is disposed in the sliding slot and the lock rod is capable of slidably moving through the sliding slot in an extending direction of the sliding slot.

6. The child sitting saddle according to claim 2, wherein, the second lock mechanism comprises a pull rod slidable with respect to the seat rod assembly along a front-rear direction, and a pull handle fixedly disposed on the pull rod, the pull rod is fixedly connected with the lock rod, and when the pull handle is pulled frontward, the lock rod is slided frontward with respect to the seat rod assembly by pulling the pull rod until the lock rod is disengaged from the lock slot.

7. The child sitting saddle according to claim 2, wherein, the connecting rod is provided with a support portion, and when the child sitting saddle is in the sleeping basket state, the lock rod is provided on the support portion.

8. The child sitting saddle according to claim 1, wherein, the enclosure frame assembly has a close frame structure, the connecting rods are respectively disposed at two sides of the enclosure frame assembly, the seat rod assembly comprises a seat rod extending along a front-rear direction, the seat rods have a U-shaped structure with an opening facing rearward, a rear end portion of the U shape of the seat rod is rotatably connected with the second end portion of the connecting rod on a corresponding side, and the second lock mechanism is respectively disposed between the seat rods and the connecting rods on both sides.

9. The child sitting saddle according to claim 1, wherein, the enclosure frame assembly comprises a connector at a middle portion of the enclosure frame assembly, an upper enclosure frame connected to an upper end portion of the connector, and a lower enclosure frame connected to a lower end portion of the connector, the plug connector is rotatably connected with the connector, and the first end portion of the connecting rod is fixedly connected to the connector.

10. A child stroller, wherein, comprising a stroller frame and a child sitting saddle according to claim 1 detachably connected on the stroller frame.

11. A child stroller, comprising a stroller frame and a child sitting saddle according to claim 2 detachably connected on the stroller frame.

12. A child stroller, comprising a stroller frame and a child sitting saddle according to claim 3 detachably connected on the stroller frame.

13. A child stroller, comprising a stroller frame and a child sitting saddle according to claim 4 detachably connected on the stroller frame.

14. A child stroller, comprising a stroller frame and a child sitting saddle according to claim 5 detachably connected on the stroller frame.

15. A child stroller, comprising a stroller frame and a child sitting saddle according to claim 6 detachably connected on the stroller frame.

16. A child stroller, comprising a stroller frame and a child sitting saddle according to claim 7 detachably connected on the stroller frame.

17. A child stroller, comprising a stroller frame and a child sitting saddle according to claim 8 detachably connected on the stroller frame.

18. A child stroller, comprising a stroller frame and a child sitting saddle according to claim 9 detachably connected on the stroller frame.

* * * * *